April 25, 1967  H. J. TYLER ETAL  3,316,375
CONTROL DEVICE AND PARTS THEREFOR OR THE LIKE
Filed Oct. 12, 1964  4 Sheets-Sheet 1

INVENTORS
HUGH J. TYLER
DENIS G. WOLFE
BY
Cauden & Cauden
THEIR ATTORNEYS

INVENTORS
HUGH J. TYLER
DENIS G. WOLFE

BY

THEIR ATTORNEYS

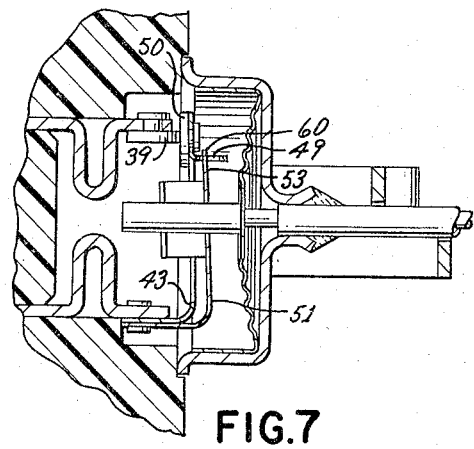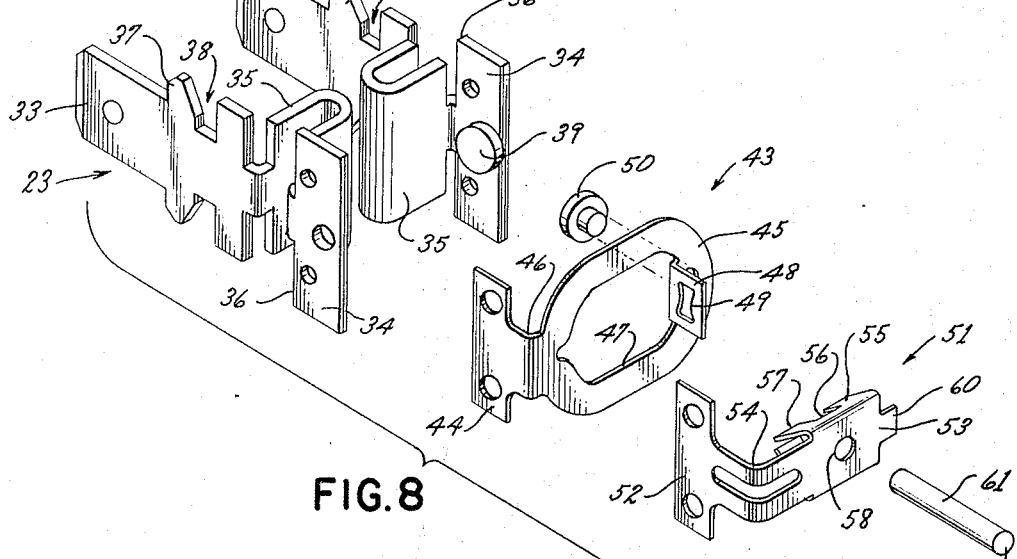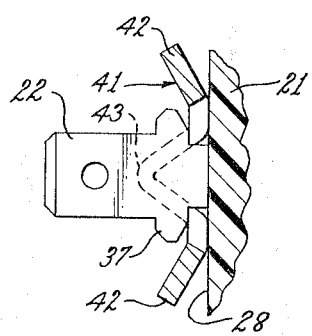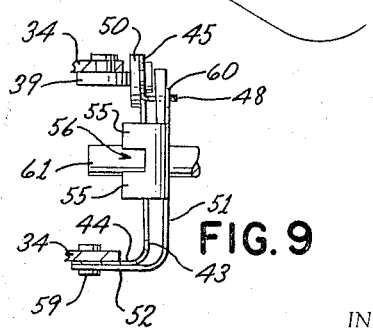
INVENTORS
HUGH J. TYLER
DENIS G. WOLFE
THEIR ATTORNEYS April 25, 1967 H. J. TYLER ETAL 3,316,375
CONTROL DEVICE AND PARTS THEREFOR OR THE LIKE
Filed Oct. 12, 1964 4 Sheets-Sheet 4

INVENTORS
HUGH J. TYLER
DENIS G. WOLFE
BY
*Caudr & Caudr*
THEIR ATTORNEYS

# United States Patent Office 3,316,375
Patented Apr. 25, 1967

3,316,375
CONTROL DEVICE AND PARTS THEREFOR OR THE LIKE
Hugh J. Tyler, Jeannette, and Denis G. Wolfe, Youngwood, Pa., assignors to Robertshaw Controls Company, Richmond, Va., a corporation of Delaware
Filed Oct. 12, 1964, Ser. No. 403,039
8 Claims. (Cl. 200—140)

This invention relates to an improved control device or the like as well as to improved parts for such a control device or the like.

In particular, this invention relates to a control device or the like wherein operating means is carried by a housing means and is moved between its operating positions by a condition responsive means carried by the housing means and sensing different conditions.

Certain of the features of this invention are to provide improved parts for such a control device or the like.

Accordingly, it is an object of this invention to provide an improved control device or the like having one or more of the novel features set forth above or hereinafter shown or described.

Another object of this invention is to provide improved parts for such a control device or the like.

Other objects, uses and advantages of this invention are apparent from a reading of this description which proceeds with reference to the accompanying drawings forming a part thereof and wherein:

FIGURE 7 is a view similar to FIGURE 6 and illustrates the control device in its overshooting position.

FIGURE 8 is an exploded perspective view of certain of the operating parts of the control device of FIGURE 1.

FIGURE 9 is a fragmentary side view of the operating levers of the control device of FIGURE 1.

FIGURE 10 is a fragmentary view similar to FIGURE 2 and illustrates the terminal locking means before the same has been moved to its locking position.

Figure 1:
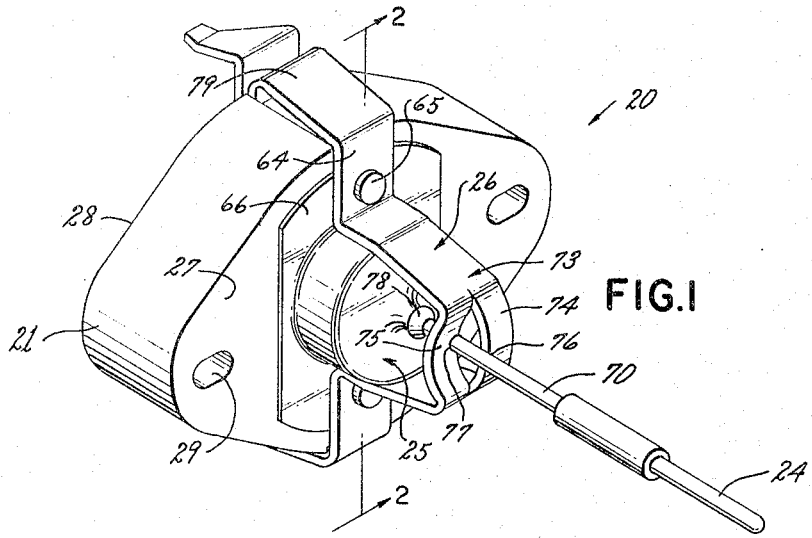
FIGURE 1 is a perspective view of one embodiment of the control device of this invention.

While the various features of this invention are hereinafter described and illustrated as being particularly adaptable for an electrical switching means, it is to be understood that the various features of this invention can be utilized singly or in any combination thereof to provide other types of control devices or the like.

Therefore, this invention is not to be limited to only the embodiments illustrated in the drawings, because the drawings are merely utilized to illustrate one of the wide variety of uses of this invention.

Referring now to FIGURES 1-4, the improved control device of this invention is generally indicated by the reference numeral 20 and comprises a housing means 21 carrying a pair of terminals 22 and 23 adapted to be electrically interconnected together in a manner hereinafter described upon a temperature sensing bulb 24 of a condition responsive means 25 sensing a predetermined temperature, the condition responsive means 25 being secured to the housing means 21 by a mounting bracket 26 of this invention in a manner hereinafter described.

While the housing means 21 can have any suitable shape and be formed of any suitable material, the embodiment thereof illustrated in the drawing is formed from ceramic material having opposed flat surfaces 27 and 28 interrupted by mounting bolt holes 29.

The housing means 21 has a cavity 30 provided therein and interconnected to the side 28 thereof by slots 31 and 32 which respectively receive the terminals 22 and 23.

As illustrated in FIGURE 8, each terminal 22 and 23 has a pair of opposed ends 33 and 34 and is provided with a tension loop 35 intermediate the ends 33 and 34 for a purpose hereinafter described. The end 34 of each terminal 22 and 23 has a housing engaging surface 36 while the end 33 thereof has outwardly directed tangs 37 cooperating therewith to define recesses 38 for a purpose hereinafter described.

The end 34 of the terminal 22 has an electrical contact 39 fixed thereto in any suitable manner.

Figures 2, 3:
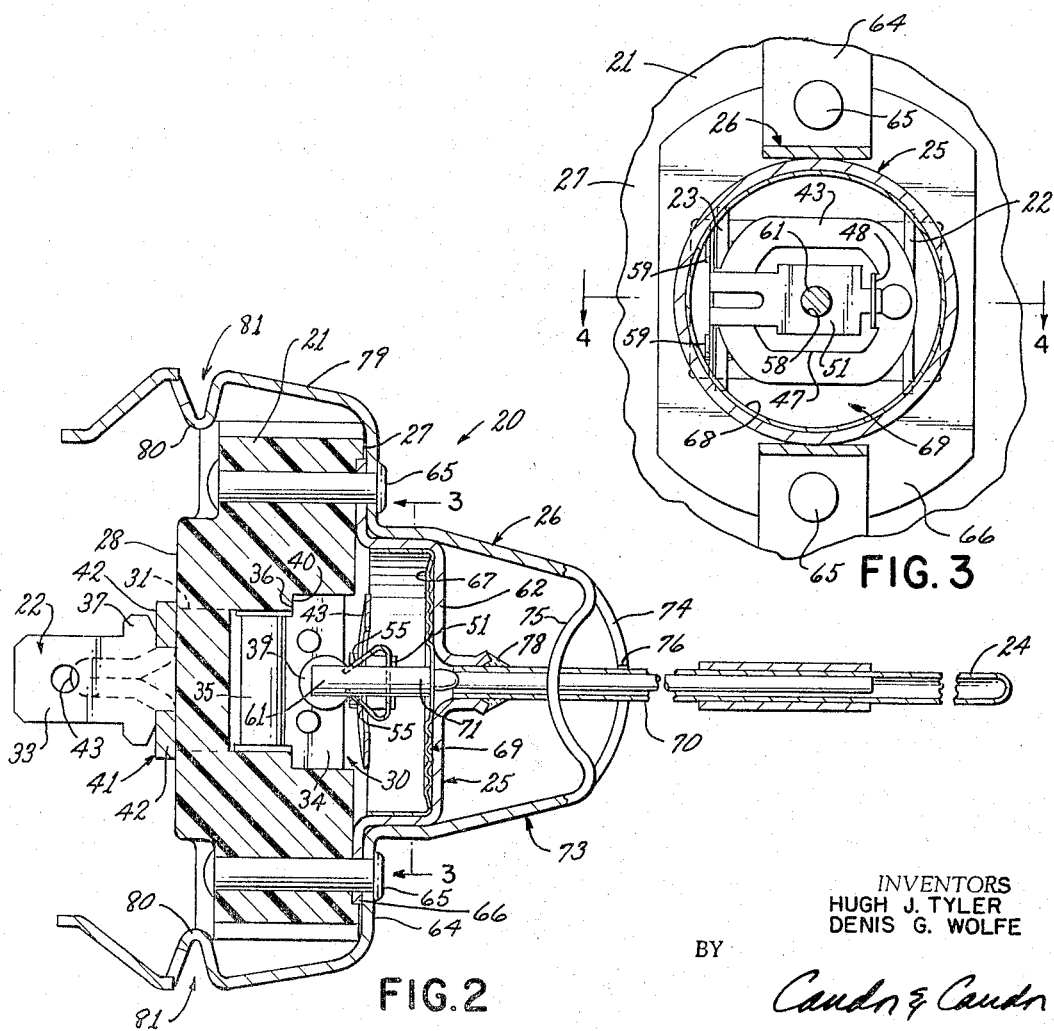
FIGURE 2 is an enlarged, cross-sectional view taken substantially on line 2—2 of FIGURE 1.
FIGURE 3 is a fragmentary, cross-sectional view taken on line 3—3 of FIGURE 2.

In order to interconnect the terminals 22 and 23 to the housing means 21, the surfaces 36 of the ends 34 of the terminals 22 and 23 are respectively disposed against shoulder means 40, FIGURE 2, of the housing 21 to positively locate the ends 34 of the terminals 22 and 23 relative to the housing means 21.

In this manner, the ends 33 of the terminals 22 and 23 project outwardly through the slots 31 and 32 in the housing means 21 in such a manner that the flanges 37 thereof are disposed spaced from the surface 28 of the housing means 21.

A pair of locking members 41 having the original configuration illustrated in FIGURE 10 are utilized to not only place the terminals 22 and 23 under tension between the ends 34 and 33 thereof, but also to positively lock the terminals 22 and 23 to the housing means 21, the locking means 41 each having a pair of flat portions 42 interconnected together by loop portions 43 thereof.

When each locking member 41 is deformed from the position illustrated in FIGURE 10 to the position illustrated in FIGURE 2, it can be seen that the flat portions 42 thereof are wedged inwardly between the flanges 37 of the respective terminal 22 or 23 and the surface 28 of the housing means 21 to place the terminal 22 or 23 under tension between the shoulders 40 and the surface 28 so as to positively hold the surfaces 36 of the terminals 22 and 23 against the shoulders 40, the tension loop 35 of the respective terminal 22 or 23 permitting the same to be readily placed under tension whereby the locking member holds the surface 36 of the respective terminal 22 or 23 against the shoulders 40 of the housing means 21 with a force of approximately 30 to 50 pounds.

Thus, it can be seen that once the terminals 22 and 23 have been locked to the housing means 21 in the above manner, the ends 34 thereof are maintained in fixed position relative to the housing means 21 so that subsequent manipulation or deformation of ends 33 of terminals 22 and 23 will not affect the maintenance of the fixed position of ends 34 of the terminals 22 and 23 relative to the housing means 21; thus, subsequent calibration of the control device 20 will remain stable.

As illustrated in FIGURE 8, a first flexible member 43 is provided and has a pair of opposed ends 44 and 45 disposed at right angles relative to each other by a bent portion 46 thereof. The end 45 of the flexible member 43 has an opening 47 provided therethrough and from which is carved an outwardly directed tang 48 having a slot 49 passing therethrough. The end 45 of the flexible member 43 carries a movable contact 50 in any suitable manner.

As illustrated in FIGURE 8, a second flexible member 51 is provided and has opposed ends 52 and 53 disposed at right angles relative to each other by a bent portion 54 of the member 51. The end 53 of the flexible member 51 has a pair of angled finger-like portions 55 respectively provided with recesses 56 at the free ends 57 thereof for a purpose hereinafter described. A substantially circular opening 58 passes through the end 53 of the flexible member 51 and is substantially aligned with the fingers 55 thereof for a purpose hereinafter described.

Figure 4:
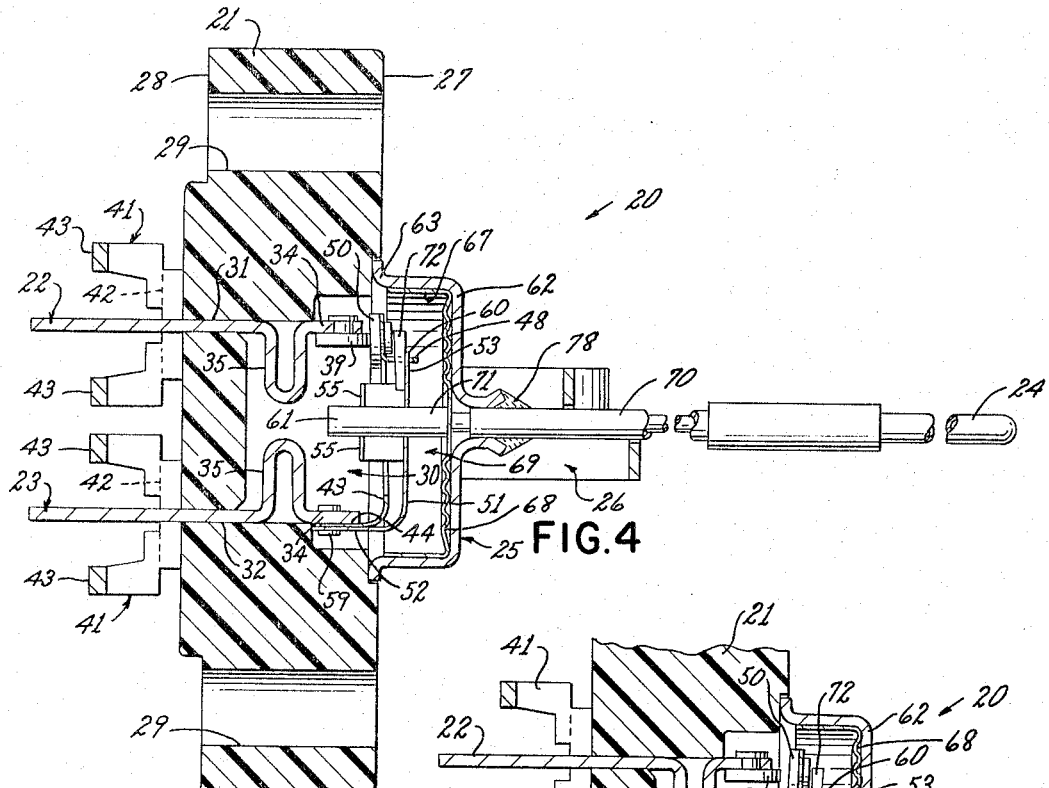
FIGURE 4 is a cross-sectional view taken substantially on line 4—4 of FIGURE 3.

The ends 44 and 52 of the flexible members 43 and 51 are adapted to be respectively interconnected to the end 34 of the terminal 23 in stacked relation by a common fastening means 59 in the manner illustrated in FIGURE 4 whereby an outwardly directed tang 60 on the end 53 of the flexible member 51 is received in the overshoot slot 49 of the tang 48 of the flexible member 43.

A substantially cylindrical rod-like member or motion transmitting means 61 is adapted to project loosely through the opening 58 in the flexible member 51 and be slidingly received between the flexible fingers 55 of the flexible member 51 which project through the opening 47 in the flexible member 43, the resiliency of the fingers 55 tending to frictionally hold the rod-like member 61 in a fixed sliding relationship therewith as the rod-like member 61 is received in the slots 56 of the fingers 55 in the manner illustrated in FIGURE 9.

The condition responsive means 25 includes a cup-shaped member 62 adapted to have the open end 63 thereof held against the surface 27 of the housing means 21 by the mounting bracket 26 having portions 64 fastened to the housing means 21 by fastening means 65 respectively passing through the portion 64 of the mounting bracket 26 and a peripheral flange 66 at the open end 63 of the member 62.

Another cup-shaped member 67 is secured in the cup-shaped member 62 and has a fluted wall 68 cooperating therewith to define a chamber 69 interconnected to the temperature sensing bulb 24 by the conduit means 70.

The movable wall 68 of the condition responsive means 25 is engageable with an end 71 of the rod-like member 61.

When it is desired to assemble and calibrate the device 20 of this invention, an insert 72 formed of a material that can be subsequently vaporized is disposed in the slot 49 of the flexible member 43 in the manner illustrated in FIGURE 4 to prevent the end 53 of the flexible member 51 from moving relative to the flexible member 43.

In addition, an unset epoxy resin, or similar material, is disposed on the end 53 of the flexible member 51 in the area of hole 58 and the rod-like member 61 to be later set by heat in a manner hereinafter described.

Thereafter, the condition responsibe means 25 is assembled to the housing means 21 by the mounting bracket 20 whereby the flange 66 of the condition responsive means 25 is firmly held against the surface 27 of the housing means 21. With the temperature sensing bulb 24 of the condition responsive means 25 sensing a temperature lower than the desired temperature for closing the contacts 50 and 39, the end 71 of the rod-like member 61 is disposed against the wall 68 of the condition responsive means 25 and holds the contacts 50 and 39 together.

Figure 5:
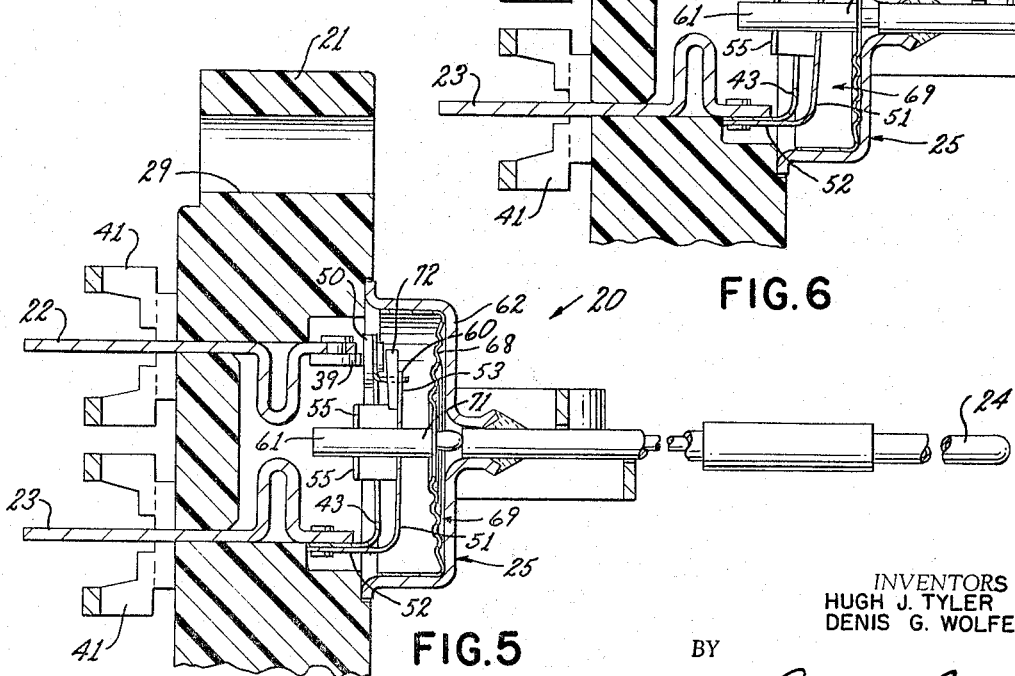
FIGURE 5 is a view similar to FIGURE 4 and illustrates the control device in another operating position thereof.

The temperature sensing bulb 24 is subsequently immersed in a fluid bath having a controlled temperature, which is dependent upon the temperature that the device 20 is to sense to close the contacts 50 and 39, whereby the movable wall 68 of the condition responsive means 25 moves to the left as the fluid expands in the bulb 24 until the movement of the wall 68 is terminated whereby the rod-like member 61 will be moved relative to the fingers 55 in the manner illustrated in FIGURE 5.

Subsequently, the control device 20 is heated to approximately 500° F. whereby the insert 72 completely vaporizes and the epoxy resin on the rod-like member 61 and end 53 of flexible member 51 in the area of hole 58 is set to permanently attach the rod-like member 61 and the fingers 55 in the position illustrated in FIGURE 5.

Figure 6:
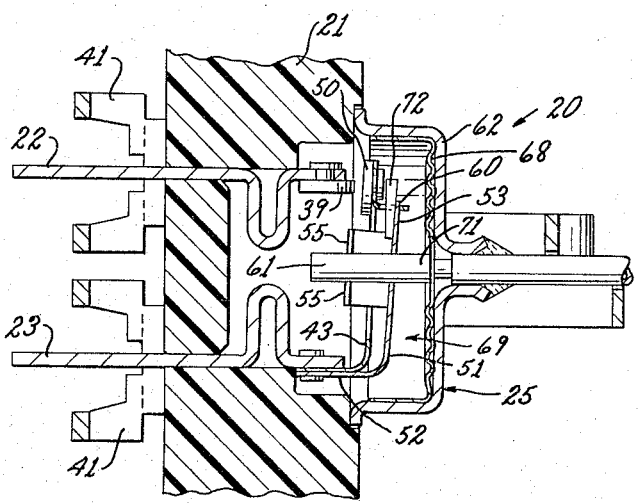
FIGURE 6 is a fragmentary view similar to FIGURE 4 and illustrates the control device in still another operating position thereof.

Thus, when the temperature sensing bulb 24 senses a temperature below the above predetermined temperature, the fluid in the chamber 60 of the condition responsive means 25 contracts whereby the wall 68 moves from the position illustrated in FIGURE 5 toward the casing 62 to permit the natural resiliency of the flexible members 43 and 51 to move to the right therewith and move the contact 50 out of electrical contact with the contact 39 in the manner illustrated in FIGURE 6.

However, should the temperature sensing bulb 24 sense an increase in temperature, the expanding fluid in the chamber 69 moves the wall 68 back to the left whereby the same moves the rod-like member 61 to the left to cause the flexible member 51 to flex relative to the end 52 thereof and cause simultaneous flexing of the member 43 so that the contact 50 is moved toward the contact 39, the contact 50 being moved against the contact 39 when the temperature sensing bulb 24 senses the predetermined temperature. Such flexing movement of the flexible member 43 is because the member 43 is biased against flexible member 51, and, since member 51 is heavier than member 43, flexing movement of member 51 controls the flexing movement of member 43.

However, should the temperature sensed by the temperature sensing bulb 24 exceed the predetermined temperature, it can be seen that the end 53 of the flexible member 51 is adapted to move further to the left relative to the flexible member 43 when the flexible member 43 has the contact 50 thereof engaging the contact 39 because the tang 60 of the flexible member 51 can move in the overshoot slot 49 in the manner illustrated in FIGURE 7 to prevent the increased temperature from adversely affecting the flexible member 43.

While the insert 72 can comprise any suitable material having the above-mentioned properties, one embodiment therof is a copolymer acetal resin sold under the trademark Celcon by the Celanese Corporation of America of New York, New York.

Therefore, it can be seen that the control device 20 of this invention is adapted to be readily calibrated in one simple operation without requiring calibration of individual parts thereof before the same are assembled together.

The mounting bracket 26 has a bifurcated portion 73 defining a pair of split sections 74 and 75 respectively having arcuate cross-sectional configurations whereby the concave faces thereof of the section 74 and 75 face each other and are respectively provided with recesses 76 and 77 which receive the conduit 70 of the condition responsive means 25 and supports the same at a point spaced from its interconnection 78 with the casing 62 to prevent bending at the weld point 78 which is readily subject to failure.

The mounting bracket 26 has a pair of rearwardly extending arms 79 provided with looped portions 80 which permit the arms 79 to be snap-fitted in a recess of a supporting structure so that the edge of the recess can be received in the notches 81 thereof whreby the control device 20 of this invention is readily adapted to be snap-fitted to a supporting structure by the arms 79 thereof as well as be fastened thereto by the mounting holds 29 previously described.

Figure 11:
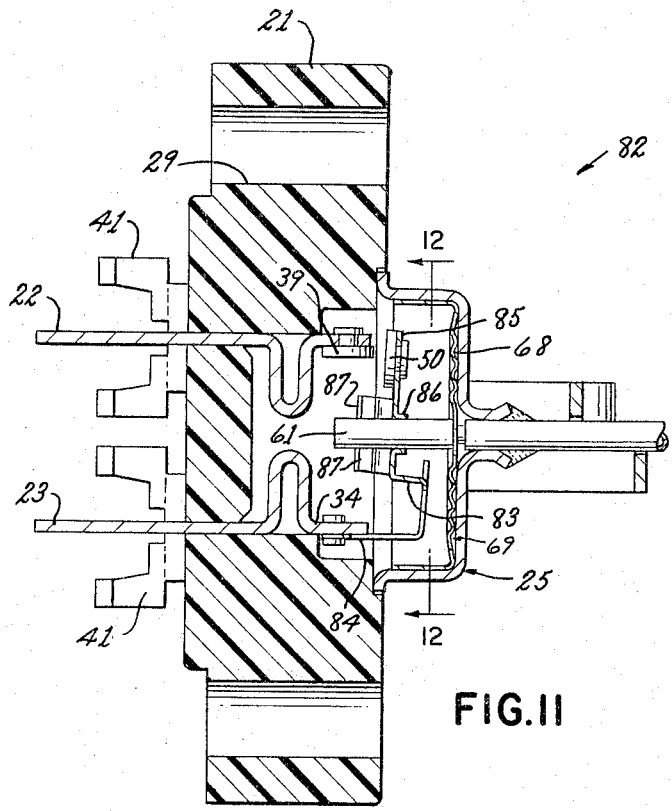
FIGURE 11 is a view similar to FIGURE 4 and illustrates another embodiment of this invention.
Figure 12:
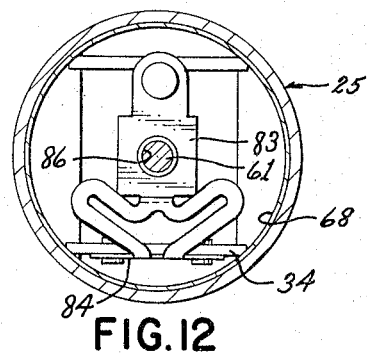
FIGURE 12 is a fragmentary, cross-sectional view taken substantially on line 12—12 of FIGURE 11.

While the control device 20 of this invention has been previously described as having two flexible members 51 and 43, it is to be understood that the same could be modified in the manner illustrated in FIGURES 11 and 12 wherein another control device of this invention is generally indicated by the reference numeral 82 and parts therof similar to the control device 20 are indicated by like reference numerals.

However, instead of the flexible members 43 and 51 of the control device 20, the control device 82 of this invention has a single flexible member 83 having one end 84 thereof interconnected to the end 34 of the terminal 23 and has the other end 85 thereof carrying the movable contact 50. The flexible member 83 has an opening 86 passing through the end 85 thereof and aligned with a plurality of flexible fingers 87 adapted to slidingly receive the rod 61 in the manner previously described.

Thus, it can be seen that when the wall 68 of the condition responsive means 25 of the control device 82 moves to the left, the same moves the rod 61 therewith to flex the flexible member 83 to the left to place the contact 50 into electrical contact with the contact 39 when the condition responsive means 25 senses a predetermined temperature, the control device 82 being substantially calibrated in the same manner as the control device 20 except that no overshoot means are provided therein whereby the insert 72 is eliminated.

Accordingly, it can be seen that not only does this invention provide improved control devices or the like, but also this invention provides improved parts for such control devices or the like.

While the form of the invention now preferred has been disclosed as required by the statutes, other forms may be used, all coming within the scope of the claims which follow.

What is claimed is:

1. In a control device or the like having a housing means, the improvement comprising a pair of terminals carried by said housing means, a fixed electrical contact carried by one of said terminals, a first flexible member having one end secured to the other terminal, a movable electrical contact carried on the other end of said first flexible member, said first flexible member having an opening passing therethrough intermediate said ends thereof, a second flexible member having one of the ends thereof secured to said housing means and having a plurality of fingers projecting through said opening of said first flexible member, a rod-like motion transmitting member slidingly received between said fingers to flex said flexible members, and a condition responsive means carried by said housing means and having a movable member controlling movement of said rod-like member whereby said condition responsive means varies the position of said movable contact relative to said fixed contact.

2. In a control device or the like as set forth in claim 1, said fingers project away from said movable member of said condition responsive means.

3. In a control device or the like as set forth in claim 1 said fingers each having a recess therein receiving said rod-like member.

4. In a control device or the like having a housing means, the improvement comprising a pair of terminals carried by said housing means, a fixed electrical contact carried by one of said terminals, a flexible member having one end secured to the other terminal, a movable electrical contact carried on the other end of said flexible member, a rod-like motion transmitting member operatively interconnected to said flexible member to flex the same, a condition responsive means carried by said housing means and having a movable member controlling movement of said rod-like member whereby said condition responsive means varies the position of said movable contact relative to said fixed contact, and means for placing one of said terminals under tension between the ends thereof.

5. In a control device or the like having a housing means, the improvement comprising a first flexible member secured to said housing means and having a free end, an operating element carried by said free end, a second flexible member secured to said housing and having integral means directly engaging said first flexible member for controlling flexing movement of said first flexible member upon flexing of said second flexible member, and motion transmitting means carried by said housing means for flexing said second flexible member to control movement of said operating element, said motion transmitting means including a rod-like member and said second flexible member having a plurality of fingers slidingly receiving said rod-like member therebetween.

6. In a control device or the like as set forth in claim 5, said motion transmitting means including a condition responsive means having a movable member engageable with said rod-like member.

7. In a control device or the like having a housing means, the improvement comprising a pair of terminals carried by said housing means, a fixed electrical contact carried by one of said terminals, a flexible member having one end secured to the other terminal, a movable electrical contact carried on the other end of said flexible member, said flexible member being bent to dispose said ends thereof at substantially a right angle relative to each other, a rod-like motion transmitting member operatively interconnected to said flexible member to flex the same and having a movement substantially perpendicular to said other end of said flexible member, and a condition responsive means carried by said housing means and having a movable member controlling movement of said rod-like member whereby said condition responsive means varies the position of said movable contact relative to said fixed contact, said flexible member having a plurality of fingers slidingly receiving said rod-like member therebetween.

8. In a control device or the like having a housing means, the improvement comprising a pair of terminals carried by said housing means, a fixed electrical contact carried by one of said terminals, a flexible member having one end secured to the other terminal, a movable electrical contact carried on the other end of said flexible member, said flexible member being bent to dispose said ends thereof at substantially a right angle relative to each other, a rod-like motion transmitting member operatively interconnected to said flexible member to flex the same and having a movement substantially perpendicular to said other end of said flexible member, a condition responsive means carried by said housing means and having a movable member controlling movement of said rod-like member whereby said condition responsive means varies the position of said movable contact relative to said fixed contact, and a second flexible member secured to said housing and having a plurality of fingers slidingly receiving said rod-like member therebetween, said second flexible member having integral means directly engaging said first-named flexible member for controlling flexing of said first-named flexible member upon flexing of said second flexible member.

References Cited by the Examiner

UNITED STATES PATENTS

| | | | |
|---|---|---|---|
| 2,441,192 | 5/1948 | Graves | 200—140 |
| 2,653,629 | 9/1953 | Hottenroth | 200—83 X |
| 2,761,035 | 8/1956 | Gaylord et al. | 200—168 |
| 2,813,946 | 11/1957 | Cox | 200—140 |
| 3,065,320 | 11/1962 | Cobean | 200—140 |
| 3,092,695 | 6/1963 | Abrams | 200—51 |
| 3,135,849 | 6/1964 | Kuhn et al. | 200—140 |

BERNARD A. GILHEANY, *Primary Examiner.*

H. B. GILSON, G. J. MAIER, *Assistant Examiners.*